United States Patent Office 3,325,522
Patented June 13, 1967

3,325,522
BISANILIDE COMPOUNDS AND METHODS FOR THEIR PRODUCTION
Edward F. Elslager and Donald F. Worth, Ann Arbor, Mich., assignors to Parke, Davis & Company, Detroit, Mich., a corporation of Michigan
No Drawing. Filed July 19, 1965, Ser. No. 473,231
3 Claims. (Cl. 260—397.6)

The present invention relates to new sulfur-containing bisanilide compounds and to methods for their production. More particularly, the invention relates to new p-phenylenebis(methylidyneimino - p - phenylenesulfonyl) bisanilide compounds, having the formula:

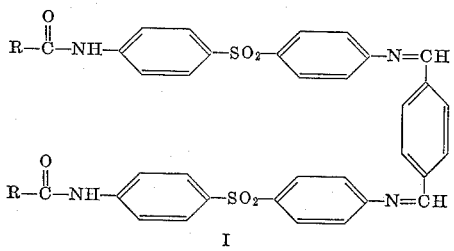

I where R is hydrogen or methyl, preferably methyl.

In accordance with the invention, compounds having the foregoing formula are produced by the reaction of a 4′-sulfanilylanilide compound, having the formula:

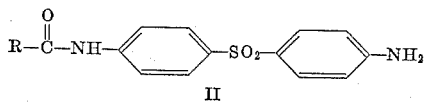

II with terephthalaldehyde in an unreactive solvent medium, where R has the aforementioned significance. Suitable solvents that may be used in the reaction are lower alkanols, such as methanol, ethanol, and isopropanol; glycols, such as ethylene glycol and propylene glycol; lower alkanoic acids, such as acetic acid and propionic acid; ethers, such as dioxane, ethylene glycol monomethyl ether, and ethylene glycol dimethyl ether; tertiary amides, such as N,N-dimethylacetamide and N,N-dimethylformamide; and dimethylsulfoxide; as well as mixtures of these. Preferred solvents are lower alkanols and lower alkanoic acids. The reaction is best carried out under essentially neutral conditions, although it can also be carried out in the presence of a catalytic amount of acid. Best results are obtained when the reaction is carried out under essentially anhydrous conditions, for although a small amount of water is not harmful, a moderate amount present in the reaction mixture may lead to decomposition of the reaction product. The products of the reaction are especially susceptible to decomposition in the presence of aqueous acid, and care should be taken to avoid bringing them into contact with an acidic aqueous medium. The reaction is favored by temperatures in excess of 40° C., and is preferably carried out at a temperature between 60° and 150° C. The duration of the reaction is not critical and may be varied widely, from 30 to minutes to 10 hours. At least two moles of the 4′-sulfanilylanilide compound of Formula II are required per mole of terephthalaldehyde, although a small excess of either reactant outside of this ratio is not harmful. At the conclusion of the reaction the reaction product normally precipitates from the solvent medium and is isolated by filtration. In those instances when the product remains in solution, it may be isolated by concentration of the solution or by addition of a suitable precipitant, such as an aliphatic ether or petroleum ether, followed by filtration.

The compounds of the invention are new chemical compounds that are of value as pharmacological agents. They are antimalarial and antileprosy agents that exhibit long duration of action. It is known that 4,4′-sulfonyldianiline is an effective antimalarial and antileprosy drug. To obtain the desired effects with this drug, however, frequent dosing, as often as once a week, is necessary. For large-scale malaria eradication programs or for mass leprosy treatment, it is impractical to administer a drug on such a frequent schedule. Furthermore, average or large doses of 4,4′-sulfonyldianiline may cause any of a number of toxic side effects. In contrast, the compounds of the present invention, while possessing the high activity of 4,4′-sulfonyldianiline, exhibit long duration of action, thereby making it possible to extend the dosage interval from one week to as long as several months, and are well-tolerated, both locally and systemically. The compounds of the invention can be formulated into suspensions that are pharmaceutically acceptable for intramuscular injection, using suspending vehicles such as 40% benzyl benzoate and 60% castor oil, or water containing emulsifying or dispersing agents.

The invention is illustrated by the following examples:

Example 1

A hot, filtered solution of 6.7 g. of terephthalaldehyde in 200 ml. of ethanol is added to a hot, stirred solution of 29.0 g. of 4′-sulfanilylacetanilide in 2000 ml. of ethanol, and the resulting solution is heated under reflux for 3 hours. The solution is then concentrated to half-volume over a 2½ hour period, and kept at room temperature overnight. The solid that precipitates is isolated by filtration, and the filtrate is further concentrated to half-volume twice more to give two additional amounts of precipitated solid. The solids are combined, slurried with boiling ethanol, isolated, and dried under reduced pressure at 75° C. The 4′,4‴-[p-phenylenebis(methylidyneimino-p-phenylenesulfonyl)]-bisacetanilide thus obtained is crystallized from dimethylsulfoxide or from N,N-dimethylformamide; M.P. >300° C. The ultraviolet absorption spectrum in N,N-dimethylformamide showed the following absorption maxima: $\lambda_{max.}$ 347 m$\mu$ ($E_1^1$ 550), $\lambda_{max.}$ 287 m$\mu$ ($E_1^1$ 740).

Example 2

A hot solution of 5.53 g. of 4′-sulfanilylformanilide in 300 ml. of ethanol is added to a solution of 1.34 g. of terephthalaldehyde in 50 ml. of hot ethanol and the mixture is heated on a steam bath for two hours. The reaction mixture is concentrated to a volume of 100 ml., and cooled. The solid 4′,4‴-[p-phenylenebis(methylidyneimino - p - phenylenesulfonyl)]bisformanilide that precipitates is isolated and dried under reduced pressure at 75° C.; yellow powder, M.P. >300° C.

We claim:
1. A p-phenylenebis(methylidyneimino - p - phenylenesulfonyl)bisanilide compound, having the formula:

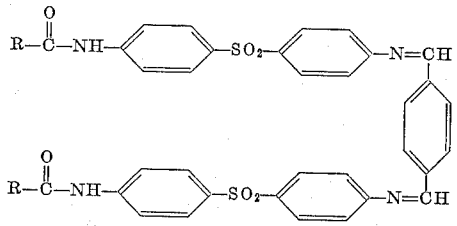

where R is a member of the class consisting of hydrogen and methyl.

2. 4′,4‴-[p - phenylenebis(methylidyneimino-p-phenylenesulfonyl)]bisacetanilide.

3. 4′,4‴-[p - phenylenebis(methylidyneimino-p-phenylenesulfonyl)]bisformanilide.

References Cited

UNITED STATES PATENTS 2,339,318   1/1944   Behnisch et al. _____ 260—397.6

FOREIGN PATENTS 491,265   8/1938   Great Britain.
579,001   7/1946   Great Britain.

OTHER REFERENCES

Kirshak et al.: Academy of Science U.S.S.R., Bulletine, Div. of Chemical Sciences, pp. 841–44 (1955).

WALTER A. MODANCE, *Primary Examiner.*

HARRY I. MOATZ, *Assistant Examiner.*